United States Patent Office 3,050,514
Patented Aug. 21, 1962

3,050,514
PROCESS AND PRODUCT OF POLYMERIZING ETHYLENIC HYDROCARBONS
Thomas M. Cawthon, Jr., Morristown, and George G. Joris, Madison, N.J., assignors to Allied Chemical Corporation, a corporation of New York
No Drawing. Filed July 16, 1956, Ser. No. 597,900
11 Claims. (Cl. 260—94.9)

This invention relates to polymerization of hydrocarbons to normally solid polymers in presence of solid, inorganic contact catalyst of ethylene polymerization having, under polymerization conditions, substantially no isomerizing activity and substantially no cracking activity. Such catalysts are broadly known.

Thus it has been proposed to polymerize ethylene to normally solid polymers at relatively low pressures such as about 1000 p.s.i.g., using a variety of solid inorganic contact catalysts including, for example, catalysts such as partially reduced trioxide of a metal of group 6b of the periodic table, supported on a difficulty reducible oxide such as silica gel, or gamma alumina, or silica-alumina plural gel. In such operations, use of a relatively large amount of solvent, e.g. sufficient to slurry the catalyst, coupled with use of elevated temperatures such as about 130° C. and up, have been recommended for dissolving product from the catalyst to keep the catalyst active. The polyethylene must be recovered from solution in the solvent.

We have now found a process for polymerizing ethylene to normally solid polymers in presence of solid inorganic contact catalyst whereby the activity of the catalyst is maintained while solid polymer accumulates on the catalyst, e.g. up to weight ratios of at least 10:1 of polymer: catalyst, and preferably much higher, e.g. 50:1 and higher. The resulting normally solid polyethylene product, containing catalyst, is in the form of separate lumps or masses characterized by having said catalyst uniformly incorporated throughout. Catalysts having a dried gel base, such as synthetic silica-alumina gel, chromium silicate gel, etc., lead to products having a porous, friable structure of low bulk density. Bulk density of the product is between about 0.1 gm./cc. and about 0.7 gm./cc. and the product is sufficiently friable to be broken between the thumb nail and finger nail. Such products of bulk density 0.1–0.5 gm./cc. are useful directly for purposes of thermal insulation and for conferring buoyancy, etc. These products can readily be ground or chopped to fine particles, e.g. 50 mesh (per linear inch) and finer. The particles can be pressure molded to films having high tear strength, high impact strength, and high abrasion resistance; and good resistance to effects of elevated and reduced temperatures. Tear strength is at least 1000 lbs. per inch; impact strength is at least 10 ft. lb. per inch of notch; abrasion resistance is at least about equal to that of nylon, being at least as good as 40 mg. loss per 1000 cycles of a coarse abrading wheel; and brittle point and softening point are respectively not above about —50° C. and not below about 125° C.

In our process ethylene or propylene gas or mixture thereof is at least intermittently contacted in substantial absence of water and elemental oxygen with a solid contact ethylene polymerization catalyst, which catalyst is maintained at temperatures at which substantially no softening of the solid polymer thereon occurs until the weight ratio of polymer:inorganic catalyst reaches at least about 10:1. More specifically, a porous, frangible solid contact substance capable of breaking into pieces serving as active ethylene polymerization catalyst is used in our process as will be explained hereinafter.

A number of solid inorganic ethylene polymerization catalysts are known. Our process applies particularly to that special class of such catalysts which comprises at least one oxygen-containing compound of an amphoteric metal. Within this class we have found catalysts are particularly useful which contain chromium as one ingredient of a catalytically active oxygen-containing compound, e.g. catalysts which contain chromium in chemical combination with oxygen. The catalysts can include a support such as a silica gel or activated charcoal, etc.

The catalysts used in our process can be regarded as being made up of fine particles, i.e. of a size to pass through a standard screen at least as fine as 50 mesh (per linear inch) and preferably about 200 mesh or finer. The catalysts are employed in our process in the form of porous, frangible agglomerates rather than in powder form such as discrete pigment particles, yet by proper choice of catalyst and operating conditions, as hereinafter described in detail, we have found that the catalyst agglomerates remain active for polymerization of gaseous ethylene even though large amounts of solid polymer accumulate in and on the catalyst.

Catalysts of the agglomerate type, suitable for use in our process, will have numerous relatively large pores, i.e. macropores of at least about 200 A. diameter, throughout the agglomerate, whereby the interior of the agglomerate is freely accessible to ethylene gas. Such catalysts consist in effect of fine particles more or less loosely bonded together to form agglomerates such as pellets, granules, etc. The catalysts in the form of agglomerates are frangible and can be broken to form fine particles, usually but not necessarily by pressing between the thumb-nail and fingernail. The porosity of our catalyst agglomerates is sufficient to give total surface area of at least about 100 square meters per gram as measured by standard gas adsorption methods; and the proportion of macropores is high enough to give average pore diameter as measured by standard gas adsorption methods of at least about 50 A. (Angstrom units) and to give bulk density not greater than about one-third the density of the predominating constituent compound of the catalyst agglomerate shown by this compound in its highest density crystalline form.

Suitable catalysts for our process can be obtained by proper activation and proper subsequent handling of certain commercial silica-alumina cracking catalysts, which need not necessarily have a promoter, such as a group 6b metal oxide, added thereto. Typical commercial catalysts which can be activated to a form useful for our process are made by a process which can be outlined as follows:

An aqueous solution of commercial sodium silicate (about 20% silica) is mixed with an aqueous solution of commercial sodium aluminate (about 7.5% alumina) at about 1:1 to about 4:1 weight ratio of $SiO_2:Al_2O_3$. To the resulting aqueous solution is added, with stirring, an aqueous solution of ammonium chloride or ammonium sulfate in amounts producing pH around 8–10. The mixture sets to a gel which is aged by heating at about 70°– 175° F., then is dried, suitably by gases of controlled moisture content and at temperatures rising from about 150°–200° F. at the entrance to the dryer to about 250°– 400° F. at the exit from the dryer. Drying is continued until a friable solid is obtained.

The friable gel is pulverized to about 100–200 mesh (per linear inch) and washed thoroughly with deionized water to free it of excess salt and is then alternatively contacted with aqueous dilute ammonium chloride solution or ammonium sulfate solution and with deionized wash water, preferably several times. The purpose of this operation is to displace any zeolitically combined sodium by ammonium ion.

The gel is now pelleted by first grinding the finely divided particles of about 100–200 mesh with sufficient water to wet the gel surface, e.g. about 60%–150% by weight of water. The grinding is continued until the fluidity of the mixture visibly increases so that a mixture which flows under agitation and sets to a rigid solid on standing is obtained (thixotropic mixture).

The mixture is poured onto a plate having holes of the desired size for forming pellets and fills the holes. Upon drying at temperatures such as about 200°–350° F. the material filling the holes solidifies into hard pellets of self-bonded fine particles. The bulk density of the pellets ranges from about 0.4 to about 0.8, depending on factors such as pH during preparation, temperatures and times of drying in each of the various drying steps, etc. These finished pellets contain on an anhydrous basis about 10–15% $Al_2O_3$ and the balance $SiO_2$ with at most traces, less than 0.5% of sodium. They can contain small amounts, less than 1%, of compounds of metals such as iron, nickel, chromium, etc. The water content of these pellets may range from about 5% to about 25% depending upon the intensity of drying.

The pelleting operation above outlined, whereby pellets of self-bonded fine particles are formed, appears to influence the pore structure of the final plural gel catalyst, so that the final catalyst contains a relatively large proportion of the pore volume in the macropore range, i.e. with diameters of at least about 200 Angstrom units, and has average pore diameter of at least 50 A.

The pellets obtained as above outlined are subjected, for preparation of commercial cracking catalysts, to a conditioning operation at elevated temperatures such as 1000° F. and above. This conditioning can be at say 1200° F. for say 8 hours in presence of an air stream containing say 20% by volume of water vapor, or at say 1400° F. for say ½ hour in presence of an air stream containing say 5% by volume of water vapor. The effect is to strengthen the pellet and remove water therefrom while controlling the surface area and pore size. Halides or ammonia, etc. can be used to modify the effect of the conditioning process.

To assure activity for our process of pellets produced as above outlined we apply shortly before use an activating and drying operation at temperatures such as 300°–600° C. Then we cool the activated catalyst, at least in the temperature range from about 200° C. down, in an atmosphere having low water vapor partial pressure, such as air of dewpoint about −20° C. or lower. Suitable atmospheres can be provided by a stream of gas, e.g. air, nitrogen, hydrogen, etc., which has been bubbled through concentrated sulfuric acid and then passed through a bed of phosphorus pentoxide.

If it has been exposed after the high temperature heating to room atmosphere, the catalyst can be thereafter rendered active by heating to about 200° C. for 2 hours under vacuum or in dry gas.

Without a heat treatment at temperature of at least about 300° C. and cooling in a dry atmosphere or drying at about 200° C. after any exposure to room atmosphere, ethylene polymerization catalysts such as known chromium trioxide on silica-alumina gel catalysts are not effective for our process.

Phosphorus pentoxide incorporated in our catalysts is of value in making the catalyst used in our process less sensitive to water poisoning so that brief exposure to atmospheric air is tolerable.

Many catalysts of the type used in our invention can be much improved by inclusion of a compound containing chromium and oxygen. Chromium in chemical combination with oxygen, e.g. as chromium trioxide in amounts between about 0.1% and 5% by weight is suitable. Also chromates and dischromates generally are useful ingredients in catalysts for our process, such as silica-alumina catalysts. Specifically sodium chromate, sodium dichromate, lithium chromate, potassium chromate, potassium dichromate, magnesium chromate, zinc chromate, strontium chromate, calcium chromate, and iron dichromate are among the chromates and dichromates which are catalytically active when added to silica-alumina catalysts prepared as above outlined. Catalysts containing chromium as one ingredient of a catalytically active oxygen-containing compound are thus a preferred sub-group of our catalysts. Suitable amounts of chromium are about 0.05–50% by weight as Cr in the catalyst. Usually the chromium amounts to not above about 15% of the total catalyst weight including supports and extenders; more particularly it amounts to about 0.1–3% as Cr, based on the total weight of the catalyst.

Oxides of metals other than group 6b metals, useful in catalysts for our process, include $Al_2O_3$, $TiO_2$, $ZrO_2$, $ThO_2$, and iron oxides, e.g. in the form of dried hydrogels. For example a gamma-alumina sold commercially as a dehydrating agent, impregnated with strontium chromate and activated as above described, is an active catalyst in our process. Chromic acid-impregnated $TiO_2$ powders are active catalysts in our process. Active catalysts were also produced from a titanium dioxide powder by mixing the powder and powdered chromium trioxide, and activating as above at about 500° C.

Another starting material for preparation of catalysts useful in our process is chromium silicate hydrogel obtained e.g. by adding chromic chloride to sodium silicate in aqueous hydrochloric acid solution, and neutralizing with ammonia. The catalyst is prepared from the hydrogel in essentially the same way as above outlined for silica-alumina catalyst from the corresponding gel.

The dried catalyst, in active form for use in our process, must be protected, in order to maintain it in active form, against contamination by poisons such as water during use for our olefin polymerization process. Adsorption of as little as $2 \times 10^{-4}$ gram of water per gram of unpromoted silica-alumina catalyst markedly inhibits polymerization in accordance with our process.

One way of protecting the catalyst against water contamination is to maintain the catalyst in contact with a substance with which water reacts to substantial completion upon contact at temperatures not above about 120° C. A suitable substance to use for this purpose is an acid anhydride or a non-polymerizing compound containing no constituents other than hydrocarbon radicals, hydride hydrogen, and metal atoms; e.g. an organic zinc compound or organic aluminum compound. Specifically, for instance, phosphorus pentoxide, zinc diethyl, aluminum triisobutyl or lithium aluminum hydride can be used, e.g. in solution or suspension in an inert anhydrous solvent such as cyclohexane, methyl cyclohexane, a hexane petroleum fraction, iso-octane, benzene, xylene, etc. Since diethyl and aluminum triisobutyl are illustrative of useful agents which have a relatively high vapor pressure and so function in the vapor phase as well as in solution to protect the catalyst from contamination by poisons.

Water vapor content of the input olefin gas brought into contact with catalyst in our process should not exceed about 20 parts per million by weight at the start of polymerization. As polymerization progresses, more water is permissible; this may be connected with the observation that as our process progresses the catalyst agglomerates swell up while retaining their original form, apparently by a process of progressive fragmentation under the pressure of accumulating polymer. Thus the active catalyst area apparently grows progressively as our process continues.

To assure the desired low water content of the input olefin, corresponding to dewpoint not above about −55° C., we pass the incoming olefin through a drying train ending with a tower such as a phosphorus pentoxide tower. The resulting gas has dewpoint not above about −70° C.

Oxygen is a poison in our polymerization process;

i.e. when oxygen is present in amounts as small as $5\times10^{-4}$ gram per gram of unpromoted silica-alumina catalyst the rate of our polymerization reaction is substantially reduced. The oxygen can be removed from the system by passing an oxygen-free gas therethrough; accordingly if a gas containing oxygen is used in the activation of the catalyst the activation should be completed under high vacuum or with a gas substantially free of oxygen, such as nitrogen, hydrogen, or oxygen-free ethylene. Oxygen-reactive substances non-poisonous to the catalyst can be used to protect the system from oxygen; these include yellow phosphorus, metal alkyls, etc. Metalalkyls such as aluminum triisobutyl and zinc diethyl, are capable of protecting the system in both liquid and vapor phase against both oxygen contamination and water contamination.

Amounts of zinc diethyl, aluminum triisobutyl, etc. which have been found effective to protect our catalyst can be very small, e.g. 1% by weight of the catalyst or less. Larger quantities, such as 10% by weight of the catalyst, have been found to be harmless. The protection required depends on the impurities present in the materials fed to the reactor and on the catalyst used, so that in some embodiments of our process no protecting agent need be added to the reaction mixture. Elemental oxygen content of the input olefin gas brought into contact with the catalyst should not exceed about 100 parts per million by weight as shown by standard galvanic method, so that good polymerization rates can be maintained. Other impurities which react like water and oxygen with sodium benzophenone, to decolorize it, are also deleterious. The total of all such impurities should be not more than about 1,000 parts per million by weight, calculated as oxygen.

We have found that polymerization in accordance with our process requires access of the olefin gas to the reaction site. Under our temperature and other conditions, the polymerization rate is greatly reduced when the catalyst is kept continuously submerged in a reaction medium such as the hydrocarbon liquids above cited which are used as solvents for zinc diethyl, etc. Nevertheless, presence of such liquids intermittently washing the catalyst, or adsorbed on the catalyst, can be desirable, apparently to prevent development of local hot spots on the catalyst in the early stages of reaction.

It is essential in our process that the polyolefin product on the catalyst shall remain solid at all times. If it is swelled by solvent or fused by heat to any substantial extent it tends to block access of olefin gas to the active sites and the polymerization will be correspondingly inhibited. Accordingly any liquid present in the polymerization reaction mixture in substantial amounts must be free of softening and swelling action on the solid polyolefin on the catalyst at the operating temperatures. Such liquid must also be non-poisonous to the catalyst and substantially inert toward alkylation by olefin under the reaction conditions. In general the saturated aliphatic and cycloaliphatic hydrocarbons and benzene and methyl-substituted benzenes such as toluene and xylenes are suitable liquids which can be present under the above limitation.

The principles upon which our process operates are not entirely clear; but in certain respects it seems clear that they differ from the principles underlying conventional polymerizations such as prior art ethylene polymerizations. One unusual phenomenon in our polymerizations is that under our polymerization conditions at given temperature and ethylene pressure, using particular catalysts, the molecular weight of our ethylene polymers is dependent chiefly upon the length of time during which polymer is accumulating on the catalyst. Also, temperature changes in the range of about 20°–120° C. have little effect on polymerization rates (grams polymer formed per gram of catalyst per hour). With promoted catalysts, such as chromium-containing catalysts, polymerization rates increase with increasing promoter concentration at least at low promoter concentration. Catalysts for which these observations hold are, for example, silica-alumina promoted with various amounts of chromium oxide varying in the range between about 0.1% and about 5% by weight (as $CrO_3$).

Apparently, judging from the foregoing, the polymerization on the above chromium oxide-containing catalysts involves a relatively rapid initiation of polymer chain growth at a rate varying with chromium concentration, followed by relatively slow continuing growth at substantially the same rates for a definite proportion of all chains which start. Such definite proportion of chains continuing to grow would seem most probably to be a very high proportion, substantially all chains, and this is confirmed by the fact that products of unusually uniform molecular weights are obtained in these operations. Thus even at very high average molecular weight of a product such as about 500,000 average molecular weight, the lowest molecular weight material separated by solvent extraction from a sample of the product has average molecular weight of about 300,000.

It seems most likely that the active sites of the continuing polymer chain growth are at the catalyst surface. Apparently the rate of chain growth is set by the rate at which ethylene can diffuse to the active sites and this accounts for the importance of using catalyst agglomerates with a relatively large number of large-size pores, 200 A. diameter and above, as previously stated.

In accordance with the foregoing we have found that molecular weights of our product can be controlled and at the same time can be kept unusually uniform in our process by varying the concentration of promoter in the catalyst, e.g. chromium oxide in silica-alumina catalyst; and/or by terminating the reaction after a definite time period which is longer the higher the desired molecular weight.

We have found that molecular weight of ethylene polymer produced in our process can also be controlled by adding to our polymerization reaction mixture an ingredient such as propylene in amounts such as for example 2%–20% by weight. Using chromia-promoted silica-alumina catalyst in accordance with our process, ethylene polymer is thus obtained at about the same rate as when ethylene is the only unsaturated ingredient of the reaction mixture, but the ethylene polymer has several-fold lower molecular weight than in absence of propylene, e.g. about 10-fold lower when the propylene initially present amounts to about 10% by weight of the total ethylene subsequently introduced into the reactor.

Like effects can be produced by incorporating in the ethylene gas any other olefin which, like propylene, has a methyl group attached to a doubly bonded carbon atom, e.g. isobutylene, 2-methyl butene, etc. Olefins having a methylene group or methine ($CH_2$ or $CH$) but no methyl group attached to a doubly bonded carbon atom can produce similar but smaller effect. Thus, in general, olefins having at least one hydrogen atom attached to an alpha carbon atom can be used as agents to control the molecular weight. Readily alkylatable substances such as cumene under conditions as just outlined are found to promote formation of liquid ethylene polymers.

The foregoing views as to prinicples operative in our process indicate that with a given reaction mixture over a given catalyst, polymerization rates will increase as pressure increases, and molecular weights reached will be the same at the same weight-yields of polymer per gram of catalyst. These effects have been found experimentally.

This influence of ethylene pressure on polymerization rate provides a means of controlling the rate of heat output due to the polymerization, so that if temperatures in the reactor begin to rise, they can be reduced by reducing the ethylene pressure in the reactor. For example to bring about a reduction of reaction temperatures, the reaction mixture can be held under a lowered total pressure, or an inert diluent gas or vapor can be added to the reaction mixture without changing total pressure, thereby reducing the ethylene partial pressure. The reaction rate and rate of heat output will be decreased but the molecular weight of product at given weight yield per gram of catalyst will be unaffected.

As our process proceeds, polymer forms throughout the catalyst mass. If the catalyst is pelleted, our products typically retain the form of the pellet but much expanded, with bulk density in the range between about 0.1 and about 0.7 gm./cc. The resulting normally solid polyolefin products have the catalyst intimately and uniformly incorporated therein, as shown by analysis of thin slices of the product.

Our products can be used for many purposes directly as formed without need of separating the catalyst. Our products are economical in view of the relatively low cost of the catalyst and the good yields of polymer per gram of catalyst which are obtainable by our process. These products will generally contain not more than about 10% of catalyst; preferred products contain at most about 2% of catalyst. Our products can be blended, e.g. with other polymers, with materials of petroleum origin, with materials of coal tar origin, etc.; such as specifically polyethylenes, crystalline and microcrystalline paraffin waxes, asphalt, etc. They can also be mixed with pigments, fillers, antioxidants, and the like, e.g. zinc chromate pigment, asbestos filler, aromatic amine antioxidant, etc.

The characteristics of products made by our process depend to some extent on choice of catalyst and other reaction conditions. Products which have particular interest in being of low bulk density, between about 0.1 and about 0.5 gm./cc. and reasonably easy to reduce to fine particle size are those products made using a porous gel catalyst, such as silica-alumina gel impregnated with a compound containing chromium. In particular, those products are of interest in which the catalyst is at a concentration of not more than about 2% by weight. In these products the catalyst is so finely divided that films formed by grinding and molding the reaction product are practically transparent with few or no catalyst particles visible therein. In these products, average molecular weight, measured by a standard viscosity method outlined in Example 1 below, is in the range about 20,000 to about 5,000,000. Minimum catalyst concentration is about 0.1%.

The products formed from ethylene, propylene, or their mixtures have essentially the empirical formula $(CH_2)_x$; essentially they are saturated alkane hydrocarbons. The products of average molecular weight about 300,000 and above, formed e.g. from ethylene over chromium-containing catalyst, have a structure of long branching chains, as indicated by reduction of average molecular weight to about 20,000 under action of oxygen. For example if xylene solutions of these products are heated at reflux temperatures while air is bubbled therethrough, the viscosity of the solutions gradually drops until it levels off at a value corresponding to average molecular weights of about 20,000.

A wide range of pressures can be used in our process; in fact we are aware of no pressure limitation thereon. As above discussed, under otherwise constant conditions the reaction rate is higher as pressures are increased, so that the pressure chosen will represent a balance of economic factors. Pressures which we have found convenient are in the range of atmospheric to 1500 p.s.i.g. as used in some of the examples below. In other examples it will be noted the pressures are subatmospheric. Essentially the same products are obtained at subatmospheric and superatmospheric pressures.

Temperatures which can be employed in our process are limited to those below the fusion point of the solid polymer incorporating the catalyst. Generally we use temperatures in the range between about ambient temperature and about 120° C. as measured by a thermocouple in the gas phase; more especially gas phase temperatures between about 20° C. and about 100° C. As efficiency of circulating the gas through the catalyst and cooling the gas goes up, gas phase temperatures increasingly near the softening point of the solid polymer can be maintained.

As above noted, we generally include in our starting reaction mixture a moderate quantity of an inert liquid, insufficient to continuously keep the catalyst completely submerged. This liquid must be free of softening and swelling action on the polyolefin on the catalyst under the operating conditions and must be relatively volatile, i.e. boil under normal atmospheric pressure at temperatures not above about 200° C. Suitable liquids include benzene, xylenes, hexanes, cyclohexane, methylcyclohexane, etc. The liquid apparently functions to prevent hot spots from developing in the early stages of reaction, e.g. by being adsorbed in the catalyst and volatilized from hot spots. The liquid can bathe the catalyst, without keeping it continuously submerged, e.g. in a rocker apparatus; or can be in a pool below the catalyst, with the catalyst supported on a screen or on trays. By the time that polymer has accumulated on the catalyst in sizable proportions such as 5:1 by weight of polymer: catalyst, the liquid initially present will usually be entirely taken up in the product so that for most of the polymerization the reaction zone will usually be free of liquid.

Benzene and xylenes have advantage in promoting formation of polyethylenes with superior extrusion characteristics, as pointed out below in the examples.

Useful amounts of these liquids are amounts, by weight, about 1 to 15 times the weight of the catalyst. Larger amounts do no harm so long as the amount remains insufficient to keep the catalyst completely submerged, under the operating conditions. Smaller amounts, down to none, can be used when heat development is adequately controlled otherwise, e.g. by use of relatively low pressure and/or by sufficiently circulating and cooling the gas.

The examples which follow describe completely certain specific embodiments of our process and are illustrative of our process, but our process is not to be considered as limited to all details of the examples.

EXAMPLE 1

A synthetic silica-alumina plural gel cracking catalyst was taken as starting material for preparation of the catalyst used in this example. This cracking catalyst was in the form of hard, friable, porous, cylindrical pellets readily reducible to fine particles of a size to pass through a 50 mesh (per linear inch) screen; the pellets were about $3/16''$ diameter x about $3/16''$ high. The bulk density of the catalyst pellets was about 0.5. This catalyst analyzed on the anhydrous basis about 87.5% $SiO_2$ and about 12.5% $Al_2O_3$ and contained traces, less than 0.1% each, of iron, nickel, and chromium, ($CrO_3$ was about 0.02% by wgt.).

The catalyst as received was tested for acidity by grinding to 250 mesh (per linear inch) powder. The amount of para dimethyl amino-azo-benzene taken up in the red salt form upon the finely powdered catalyst from anhydrous benzene solvent was measured. The acidity thus measured was .36 mg. equivalents per gram of catalyst.

The total surface area of the catalyst was measured by the usual adsorption method, known as the BET method, using n-butane as adsorbate. The value found of 279 square meters per gram is a minimum, corresponding to about 350 square meters per gram using nitrogen as adsorbate. This cracking catalyst was supplied by the Houdry Process Corporation under the designation 36D2–26X9. The average pore diameter of such catalysts is at least about 50 Angstrom units.

A 20 gram charge of the above cracking catalyst was activated for use in our process in a glass tube 1¼ inches diameter x 20 inches long, stoppered with glass wool, in an electrically heated furnace. Air in a slow stream (about 1 liter per minute) was dried by passing it first through a tower of concentrated sulfuric acid and then phosphorus pentoxide in the form of amorphous powder; then the dry air was passed through the catalyst bed.

The flow of dry air was maintained while the temperature was raised to and held at about 500° C. during about 6 hours. Then a stream of cylinder nitrogen, dried and flowed in the same manner as the air stream was substituted for the air stream. The furnace heat was then turned off. The flow of dried nitrogen was continued until the cooled catalyst was charged to the reaction autoclave for use. Dewpoint of these dry gases was below −70° C.

Air and nitrogen dried by passage over phosphorus pentoxide as above described had water vapor pressures not above $10^{-3}$ mm. of mercury, absolute.

The polymerization was carried out in a 1.8 liter stainless steel autoclave. The carefully cleaned autoclave was fitted by a gas-tight adapter below a chamber or "tent" in which were the autoclave closures and the containers of activated catalyst, zinc diethyl, and solvent for zinc diethyl. The autoclave and the tent were flushed with the $P_2O_5$-dried nitrogen by placing a glass tube in the autoclave and running the dry nitrogen through the tube and up through the tent for 15 minutes. This step displaced the moist air in the autoclave and tent with dry nitrogen. The autoclave was then charged by (1) dropping the catalyst charge (20 grams) out of the activation tube into the autoclave, (2) adding 0.5 gram of zinc diethyl to 100 milliliters of distilled, $P_2O_5$-dried, filtered methylcyclohexane solvent; (3) adding the solution of zinc diethyl in the solvent to the autoclave; and (4) closing the autoclave.

The autoclave was then placed on a rocking mechanism and connections were made to a high pressure source of high purity ethylene, analyzing at least 99% by weight pure; water content not above about 10 parts per million (dewpoint about −60° C.), oxygen content about 20 parts per million, and about 200 parts per million total impurities reactive with sodium benzophenone (calculated as oxygen). Impurities, reactive with this reagent, which might be present include water, oxygen, carbon dioxide and acetylene. This ethylene was obtained by cracking oil and subjecting the product to a mild hydrogenation treatment to remove acetylenes.

To assure that the gas phase will remain substantially free of water and oxygen, i.e. to assure a water content not exceeding about 20 parts per million and oxygen content not exceeding about 100 parts per million, the ethylene was passed through a silica gel drying vessel and then through zinc diethyl solution in methylcyclohexane.

The autoclave was provided with an electric heating element and with a thermowell for measuring the temperature at the center of the autoclave and a gauge for measuring the pressure inside the autoclave. The system was flushed with the above dried ethylene prior to final pressurizing.

The autoclave was charged with the above purified, dried ethylene to a pressure of 600 p.s.i. and was then heated, with the rocker mechanism operating, to a temperature of 90° C. The reaction was allowed to proceed for 166 hours; during that period the autoclave was repressured 17 times, maintaining pressures in the range 400–880 p.s.i.

At the end of the reaction the autoclave was cooled and vented. The product was removed, washed with acetone to remove solvent and dried in an oven at about 80° C. The dried product weighed 255.2 grams. Most of the product was recovered as friable, cylindrical pellets of about ¾ inch diameter and ¾ inch height and having bulk density of about 0.3 gm./cc.

The polyethylene product thus obtained had about 8% of silica-alumina plural gel catalyst intimately and uniformly incorporated therein. The dried pellets of product were reduced to a size to pass through a screen of 60 mesh (per linear inch) by a rotary knife cutter (Wiley mill). The resulting powdered product was extrudable to pipe at an extrusion temperature of about 160°–175° C. Molded into smooth discs by compression at about 1000–1500 p.s.i.g. between plates heated to about 190° C., this product was white and semi-transparent with minor inhomogeneities, apparently due to presence of the catalyst particles, visible throughout the discs. These discs were cut into strips which were subjected to standard tests for determining typical properties, with the following results.

Table

Ultimate tensile strength, lbs./in.$^2$:
    For 15%/min. elongation rate_____ 3135
    For 150%/min. elongation rate_____ 3495
Ultimate elongation, percent:
    For 15%/min. rate_____ 530
    For 150%/min. rate_____ 445
    Softening temperature, ° C_____ 150
    Hardness, Rockwell R_____ 60
    Tensile modulus, p.s.i., for 10%/min. rate___ 109,000
    Tear resistance, lbs./in. (Graves)_____ 1255
Flexural strength, p.s.i._____ 5330
Impact strength (Izod), ft. lbs./in. of notch____ 22.5
Brittleness temperature, ° C_____ −70
Heat distortion temperature, ° F., 66 lbs. fiber stress _____ 163
Density, gm./ml_____ 0.98
Abrasion resistance: 19.6, 21.1 mg. loss (vs. 31.7 mg. loss for polycaprolactam nylon).

Electrical properties:
    Dielectric constant, 1–2 kc_____ 2.43
    Dissipation factor, percent_____ 0.0
    Volume resistivity, ohm–cm_____ $6 \times 10^{11}$ Viscosity measurements on xylene solutions of polymers were made at 96.6° C. An ideal reduced viscosity, $n$, is found by extrapolating to infinite dilution the reduced viscosities determined at concentrations in the range 0.5–3 grams per liter, where reduced viscosity, $n_r$, is given by the expression:

$n_r=$ (viscosity of solution−viscosity of solvent)
    ÷(viscosity of solvent × concentration of solution in grams per liter)

The molecular weight, M, was calculated from this ideal reduced viscosity, $n$, by the formula of Ivan Harris, Journal of Polymer Science, vol. VIII No. 4, pages 358–361 (1952):

$$n=1.35 \times 10^{-4} M^{0.63}$$

A log-log plot of yields (gm. polymer/gm. catalyst) vs. M thus calculated for polymers made over a catalyst of the above type was roughly linear. The molecular weight, M, of the above product was about 1 million.

The catalyst was found to be separable in part from the polyethylene products obtained in this example. The product was dissolved in xylene at reflux temperature; sodium hydroxide was added; and the mixture was stirred at reflux temperature until the xylene solution became clear and the suspended solids were white. Water was then added slowly at reflux temperature and stirring was continued for about one hour. The mixture was cooled to room temperature and the polyethylene phase was given several water washings. The polyethylene was then filtered, washed with methyl alcohol, and dried. Discs pressed from this polyethylene were more transparent than those from the product containing catalyst and were visually homogeneous. The elongation and tensile strength were approximately the same as for the product containing catalyst.

EXAMPLE 2

In this example the polymerization was at subatmospheric pressures and was in absence of any liquid or purifying agent such as zinc diethyl contacting the catalyst. The cracking catalyst employed as starting material for making the catalyst of Example 1 was activated in a glass tube by heating at 150° C. for 3 hours at a pressure of about $10^{-4}$ mm. of mercury absolute.

The ethylene employed in Example 1, purified by one distillation and substantially free of water and oxygen, was passed into contact with the activated catalyst to produce a pressure of about 600 mm. of mercury absolute. The catalyst contacted by the ethylene was maintained at a temperature of about 65° C. The resulting polymerization continued for 3 hours, yielded a total of 0.3 gram of normally solid ethylene polymer per gram of catalyst in the form of pellets having particles of silica-alumina plural gel catalyst intimately incorporated therein. This polymer had the following properties.

Molecular weight by above formula: $M=130,000$.
Ultimate tensile strength, lbs./in.$^2$ (for 150%/min. elongation rate) _____ 3,700
Ultimate elongation, percent (for 150%/min. rate) _____ 90

The process could be continued at the same or different pressure to a yield of at least 10 grams of polymer per gram of catalyst. The effect of pressure, P, on rate under conditions such as those of this example is given by:

$\frac{dx}{dt}$ (or rate in gm. of polymer/gm. of catalyst/sec.)

$$=kP/(1+bx^2)$$

where P is expressed in cms. of mercury (absolute), values for the constants $k$ and $b$ are: $k=$about $3\times10^{-6}$ cm.$^{-1}$ sec.$^{-1}$, $b=$about $4\times10^2$.

EXAMPLE 3

This example was carried out by the general procedure of Example 1 with details being as noted below.

Commercial silica-alumina dried gel cracking catalyst essentially the same as the catalyst used in Example 1 was impregnated with an aqueous solution of chromic acid containing 7% by weight of chromia ($CrO_3$). Analysis for chromia deposited on the catalyst showed about 5% by weight calculated as $CrO_3$ on the catalyst, i.e. about 2.5% as Cr based on the total weight of the catalyst.

The activation of the catalyst and the charging of the reaction autoclave were as in Example 1, except as noted below. The amount of catalyst employed was 2 grams. The protecting agent was 0.75 gram of aluminum triisobutyl charged as a solution in commercial hexane at concentration of 0.15 gram per ml. Commercial hexane (25 ml.) was employed as heat control liquid. The hexane had been dried with phosphorus pentoxide powder and filtered before use. It contained about 10% by weight of aromatics.

After charging and before use the autoclave was flushed out by filling 3 times to 200 p.s.ig. with dried ethylene of the same type used in Example 1. The ethylene was dried by passing through two 1800 ml. autoclaves loaded with one pound each of phosphorus pentoxide powder distributed on ¼" Raschig rings.

The reaction temperature was in the range 70–80° C. The pressure was 400 p.s.ig. at the start, and increased after about 1¼ hours to 600 p.s.i.g. The pressure then fell to about 100 p.s.i.g. in about 1¼ hours. The pressure was thereafter restored to about 600 p.s.i.g. and again allowed to drop to about 100 p.s.i.g. for 10 cycles, each lasting about one hour. The autoclave was then opened.

Light, porous, white, friable, greatly expanded pellets formed the product. These pellets, after washing with acetone and drying, weighed 630 grams. Thus the weight of polymer formed in the reaction per gram of catalyst was 314 grams; and the rate of polymer formation in grams per gram of catalyst per hour was about 25.

The product was ground up in a Wiley mill and tested as outlined in Example 1. The ultimate elongation at a rate of 150% per minute was 530% and the ultimate tensile strength at the same rate of elongation was 4273 lbs. per sq. in., each being the average of 3 tests. The abrasion resistance measured as in Example 1 was about 35 mg. weight loss. The average molecular weight of the product was about 500,000.

EXAMPLE 4

This example was carried out like Examples 1 and 3, except that the catalyst was impregnated with an aqueous chromic acid solution containing 0.1% of chromia. The chromia deposited on the catalyst amounted to about 0.1–0.15% by weight. The charge consisted of 10 grams of the catalyst, 1.5 grams of aluminum triisobutyl and 25 ml. of commercial hexane dried as in Example 3.

The reaction was continued for 8½ hours with 8 cycles of repressuring.

The yield of polymer was 293 grams. This polymer showed ultimate elongation and ultimate tensile strength measured as in Example 3 of 503% and 4320 lbs. per sq. in., respectively.

The ground polymer product was extruded at 190° C. under nitrogen pressure of 30 p.s.i.g. to white pipe of about ¾" outside diameter and $\frac{1}{16}$" wall thickness.

EXAMPLE 5

The reactor employed in this example was a horizontal pipe of mild steel, 22 ft. long by 11¾" inside diameter, having a volume of 16.6 cu. ft. It was provided with a jacket of copper tubing through which steam or water could be passed for heating and cooling. Agitation was provided by a scraper bar running the length of the pipe at a clearance of about ⅛" and rotating about a central axis.

Before loading, the reactor was purged with the contents of one cylinder of nitrogen and with about 13 lbs. of ethylene of the type used in Example 1 above.

This ethylene was passed through adsorptive gamma alumina and through a cylinder loaded with 15 lbs. of phosphorus pentoxide powder supported on Raschig rings. The effluent ethylene purge gas was tested for oxygen and water content, and the purge was continued until these were not greater than in the cylinder ethylene being used for the purge.

The charge consisted of 2 lbs. of catalyst of the type used in Example 3 and 1 lb. of aluminum triisobutyl dissolved in 5 liters of commercial hexane dried with phosphorus pentoxide, as in Example 3 above. It was mixed in the catalyst activation vessel.

The reactor was then loaded through a port and valve system, which was flushed out with dried ethylene to prevent access of outside air during loading of the reactor.

Purified ethylene as used for the purge above was fed into the reactor to a pressure of about 250 p.s.i.g. A temperature of about 85–90° C. was maintained and the pressure was maintained in the range 100–250 p.s.i.g.

After 68 hours a yield of 214 lbs. of polymer was obtained, having properties generally similar to those of the polymer of Example 3.

Example 6

A catalyst was prepared as follows: A solution of 40 grams of reagent grade chromium trioxide and 40 grams of strontium nitrate dissolved in 1 liter of distilled water was mixed with 200 grams of the commercial cracking catalyst used in Example 3. The mixture was allowed to stand for 3 days, then the catalyst pellets were filtered out and air dried at room temperature. The pellets were activated by heating in a stream of dried air at 500° C. for 6 hours and cooling in a stream of dried nitrogen as in Example 1. Analysis by weight as metal: Cr—1.2%, Sr—0.2%.

A rocking autoclave of 320 ml. capacity was flushed with $P_2O_5$ dried nitrogen as in Example 1 above and charged with 10 grams of the above catalyst, 50 cc. of commercial hexane purified by distillation from phosphorus pentoxide, 10 cc. of a 14.6% by weight solution of aluminum triisobutyl in the above hexane, and 55 grams of liquid propylene (purified by shaking with molten sodium in a rocking autoclave at 120° C. for 2 hours). The reaction temperature was brought to 80° C. as measured by a thermocouple at the center of the autoclave and was maintained for 32 hours.

The product within the autoclave when it was opened was in the form of expanded solid pellets mixed with a slightly tacky, cheesy white solid. The tacky solid apparently did not soften the solid polymer on the catalyst pellets, and could be scraped off the pellets. Under the operating conditions the tacky solid on the pellets is discontinuous.

The product can be extracted with cyclohexane, whereby the tacky polymer in amount of 23.1 grams is removed.

The residual pellets contain 22 grams of solid polypropylene. The solid polypropylene, upon extraction into xylene, shows molecular weight of 61,000 by the method outlined in Example 1. Even at this solid polymer:catalyst ratio, and molecular weight, upon grinding and molding by pressure of 1000 p.s.i. at 190° C., the cyclohexane-extracted solid pellets can be formed into hard sheets having ultimate tensile strength of 2580 lbs. per sq. in.

The polymerization need not be halted after one batch polymerization as above; it can be continued by adding a second, third and fourth 55 gram portion of propylene purified as before, care being exercised to avoid any contamination of the reactants. Such successive polymerizations yield products which can be formed, as above, into articles of equal and greater tensile strength with a product:catalyst weight ratio of 10:1, and substantially higher. Generally similar results can be obtained by introducing the whole quantity of propylene (220 grams) in a single batch or by using a correspondingly smaller amount of catalyst, e.g. about 2 grams.

*Example 7*

The catalyst was like that of Example 3 except that its analysis for Cr was about 0.5% by weight. A 550 ml. autoclave was charged with 10 grams of this catalyst, 50 cc. of commercial hexane dried by distillation from phosphorus pentoxide, and 10 cc. of a 14.6% (weight) aluminum triisobutyl solution in said hexane. The autoclave was flushed with dried nitrogen as in Example 1 and was then pressurized with purified propylene to 120 p.s.i.g. at 18° C. The propylene, and ethylene subsequently used, were purified through trains consisting of a silica gel tower and a tower containing the above-cited 14.6% aluminum triisobutyl in dried hexane.

The autoclave was then pressurized to 550 p.s.i.g. with ethylene as used in Example 1 and was heated to 90° C. Ethylene was fed in whenever the pressure fell below 500 p.s.i.g. to a pressure of 550 p.s.i.g. with the rocker mechanism operating. The reaction period was 44 hours and the total aggregate pressure drops over this period amounted to 680 p.s.i.g.

The product within the autoclave when it was opened was in the form of expanded solid pellets mixed with a white, tacky, cheesy solid as in Example 6. The product was extracted with cyclohexane, whereby the tack solid in amount 86.6 grams was removed. The molecular weight of this cyclohexane-soluble polymer, determined as in Example 1, was 22,000.

The residual pellets contained 48.6 grams of polymer of molecular weight 180,000 by the method of Example 1. These pellets when ground and molded at 190° C. and 1000 p.s.i.g. formed a sheet with ultimate tensile strength of 1970 lbs. per sq. in.

An infrared spectograph of the solid polymer showed peaks characteristic of both polyethylene and polypropylene, indicating that the solid product is a copolymer of ethylene and propylene.

The ratio of total polymer product:inorganic catalyst by weight was 13.5:1. In the pellets after extraction this ratio was 4.9:1. Polymerization as in this example can be continued to a weight ratio of polymer:inorganic catalyst of at least 90:1. At these high polymer:catalyst ratios all of the polymer product is in the form of solid expanded pellets.

*Example 8*

Purified titanium dioxide powder, at least 99% pure, of pigment grade (anatase type) was pelleted by mixing with about 50% by weight of water and casting in a perforated plate as above outlined for silica-alumina gel. The pellets were impregnated for 2 hours with aqueous chromic acid (4% by weight $CrO_3$). Two grams of these impregnated pellets were then dried to activate them in the manner above outlined in Example 1 for about 6 hours at about 500° C. in a current of dry air which was displaced with dry nitrogen before cooling the catalyst.

A 320 ml. rocking autoclave was flushed with $P_2O_5$ dried nitrogen and charged with the resulting activated titanium dioxide-chromium oxide catalyst, with charge and procedure otherwise as in Example 3 above.

The initial ethylene pressure was 400 p.s.i. The operating temperature measured in the gas phase by a thermocouple in the center of the autoclave was about 76° C. The pressure was twice restored by adding more ethylene during a reaction period of 12.5 hours.

The product at the end of that time was in the form of expanded masses with the polyethylene amounting to 94 grams, i.e. the weight ratio of solid polymer:original water-containing catalyst charged to the activation step was 47:1. Allowing for the water in the catalyst pellets which was removed by activation, the polymer:inorganic catalyst ratio was at least 50:1.

EXAMPLE 9

A chromium silicate hydrogel was prepared by acidifying aqueous sodium metasilicate with concentrated aqueous hydrochloric acid, adding about one-quarter the calculated amount of chromic chloride to form $$2[H_6Cr_2(SiO_4)_3] \cdot H_4SiO_4$$

and precipitating the hydrogel by addition of aqueous sodium hydroxide. The gel was water washed to remove sodium salts.

Specifically, to a solution of 71 grams of J. T. Baker reagent grade sodium metasilicate $Na_2SiO_3 \cdot 9H_2O$ (0.253 mol) in 250 cc. of distilled water there was added rapidly with stirring 59 cc. (0.71 mol) of concentrated hydrochloric acid. The temperature rose from 21° to 41° C. To the resulting silicic acid solution there was added a solution of 9.84 grams (0.037 mol) of Baker and Adams reagent grade chromic chloride ($CrCl_3 \cdot 6H_2O$) in 185 cc. of distilled water. There was then added slowly with stirring 20% sodium hydroxide until the pH reached 6.0. The gel that formed was filtered and washed with distilled water until free of sodium salts. After drying at 100° C. there was obtained 16 grams of lump catalyst.

The material was ground to 100 mesh and screened. The powder was stirred with the addition of small quantities of water until a thixotropic mass was obtained. An aluminum plate ¼ inch thick was drilled with many rows of holes ⅛ inch in diameter and slightly tapered so that the dried pellets could be readily pushed out. The drilled plate was then attached with a back-up plate to a vibrator and the thixotropic mass was poured into the holes of the aluminum plate. The plate was then heated with an infrared lamp for about one hour until the catalyst was dry. The pellets were then pushed out of the holes with a stylus.

The pellets were heated in steam at 523° C. and 1 atmosphere pressure for 15 hours.

Two grams of the resulting pellets were activated at 500° C. for 6 hours as in Example 1 above. The catalyst contained about 10–15% by weight Cr. The activated pellets were charged, as in Example 1, to a 320 ml. capacity rocking autoclave together with 25 cc. of commercial hexane dried by distillation from phosphorus pentoxide and 7.5 cc. of a 14.6% (weight) solution of aluminum triisobutyl in said hexane.

Propylene, purified by passage through a silica gel tower and a tower containing aluminum triisobutyl in hexane solution as above described, was fed into the autoclave to a pressure of 105 p.s.i.g. Then ethylene of the quality described in Example 1, purified like the above propylene by passage through silica gel and aluminum triisobutyl solution, was introduced into the autoclave.

The temperature measured by a thermocouple at the center of the autoclave was maintained at about 90° C. and the pressure was maintained by periodic addition of said ethylene in the range of about 300–500 p.s.i.g. These conditions were maintained for 78 hours. The sum of the pressure increments produced by input ethylene was 4165 p.s.i.g. The reaction at this time had not come to a halt.

The product obtained was in the form of greatly enlarged pellets. The weight of solid polymer was 94 grams, representing a ratio by weight of 47:1 of polymer:water-containing catalyst charged to the activation step. Taking account of the water removed from the catalyst by activation, the weight ratio of solid polymer:inorganic catalyst was at least 50:1.

EXAMPLE 10

The catalyst was sodium chromate on silica-alumina gel. It was prepared by mixing commercial silica-alumina dried gel cracking catalyst as used in Example 3 above with an aqueous solution of sodium chromate, $Na_2CrO_4$, containing 1.04 weight percent of Cr. The mixture was allowed to stand for 20 hours and was then air dried for 4 hours. Upon analysis the catlyst thus prepared showed a chromium content of 0.21 percent by weight Cr.

Two grams of the catalyst were activated as in Example 1 above at about 500° C. for 6 hours in a stream of air dried by phosphorus pentoxide followed by cooling in a stream of nitrogen dried by phosphorus pentoxide. The charging of the autoclave for reaction and operating procedure were as in Example 3 above, except that the aluminum triisobutyl used as protecting agent was at a concentration of 0.31 gram per ml. in $P_2O_5$ dried commercial hexane and was used in an amount of 1 gram of aluminum triisobutyl.

The temperature during the reaction averaged 74° C. plus or minum about 8° C. at the center of the autoclave, as measured by a thermocouple in the thermowell. Pressure varied between 530 and 300 p.s.i.g., being restored by adding fresh ethylene over a reaction period of 11 hours.

The product was in the form of expanded pellets and amounted to 170 grams of solid polyethylene in addition to 2 grams counted as catalyst. Thus the ratio of solid polymer:inorganic catalyst was at least 85:1.

The product was generally similar to that of Example 1. This product was ground up and tested as in Example 3 with the following results:

Ultimate tensile strength, lbs./in.$^2$_____ 3460
Ultimate elongation, percent_____ 470
Abrasion resistance, mg. loss/1000 cycles_____ 21.3

A pipe was formed from the product by extrusion at 185° C.

The polymer was mixed with polyethylene wax of average molecular weight about 1500 at weight ratio of 1:3 of polymer:wax and was milled with 0.5% by weight of "Flexamine" aromatic amine type aging inhibitor. This blend was tested for melt index in a F. F. Slocumb Corp. testing machine at 190° C. extrusion temperature using a 2160 gram weight. The melt index thus measured was 2.14 grams per 10 minutes.

EXAMPLE 11

This example was carried out in the same way and with similar results to those of Example 10, with the following exceptions: The catalyst was made up using magnesium chromate, $MgCrO_4.5H_2O$. It analyzed 0.24% by weight Cr. The average temperature was 77° C. and the pressure ranged from 600 to 300 p.s.i.g.

In reaction time of 11 hours, 217 grams of solid polyethylene were formed, corresponding to a ratio of solid polymer:inorganic catalyst of at least 108.5:1. The properties, tested as in Example 10, were:

Ultimate tensile strength, lbs./in.$^2$_____ 3037
Ultimate elongation, percent_____ 490
Melt index, grams per 10 minutes_____ 2.33
Abrasion resistance, mg. loss/1000 cycles_____ 14.5

EXAMPLE 12

This example was carried out in the same way and with similar results to those of Example 10, with the following exceptions: The catalyst was made up using zinc chromate, $ZnCrO_4$, dissolved in 10% aqueous nitric acid. It analyzed 0.49% by weight Cr. The average temperature of reaction was 80° C. and the pressure varied from 510 to about 300 p.s.i.g.

In a 10-hour reaction period, 431 grams of solid polyethylene were formed, corresponding to a ratio of solid polymer:inorganic catalyst of at least 215.5:1. The properties of this polymer, tested by the procedure of Example 10, were:

Ultimate tensile strength, lbs./in.$^2$_____ 3980
Ultimate elongation, percent_____ 503
Melt index, grams per 10 minutes_____ 2.11

EXAMPLE 13

This example was carried out in the same manner and with similar results to those of Example 12, except that the temperature control liquid was 25 ml. of thiophene-free reagent grade benzene slurried with $P_2O_5$ and filtered, instead of 25 ml. of commercial hexane. The average reaction temperature was 76° C. and the pressure range was between about 500 and about 300 p.s.i.g.

In a reaction period of 9 hours, 403 grams of solid polyethylene were formed, corresponding to a weight ratio of solid polymer:inorganic catalyst of at least 20.5:1. The properties of this polymer, measured as in Example 10, were:

Ultimate tensile strength, lbs./in.$^2$_____ 3257
Ultimate elongation, percent_____ 540
Abrasion resistance, mg. loss/1000 cycles_____ 11.1
Melt index, grams per 10 minutes_____ 5.9

A pipe was extruded from the ground-up product at 190° C. and showed very good flow and was color stable under the extrusion conditions.

EXAMPLE 14

This example was carried out using benzene as temperature control liquid, in the same way and with similar results to those of Example 13, except as follows: The catalyst was made up using aqueous chromic acid containing 2% by weight $CrO_3$. It analyzed 0.905% by weight Cr. The protecting agent was 0.75 gram of aluminum triisobutyl as a 0.31 gram/ml. solution in hexane as in Example 10. The average reaction temperature was 77° C. and pressure varied between about 500 and about 300 p.s.i.g.

In a reaction period of 13 hours, 433 grams of solid polyethylene were formed, corresponding to a solid polymer:inorganic catalyst weight ratio of at least 216.5:1. The properties of this polymer, tested as in Example 10, were:

Ultimate tensile strength, lbs./in.$^2$_____ 3595
Ultimate elongation, percent_____ 550
Abrasion resistance, mg. loss/1000 cycles_____ 9.2

Similar results were obtained using xylene instead of benzene.

About 10% aromatics are present, as noted in Example 3 above, in the commercial hexane fractions employed in the examples herein. The preceding two examples, 13 and 14, demonstrate that under our reaction conditions, alkylation-resistant aromatics such as benzene and xylene in weight ratios of about 10:1 of aromatic hydrocarbon: inorganic catalyst have a beneficial effect on properties of the polyethylene product, including flow properties at extrusion temperatures, and ultimate elongation. Preferred products show, as in Examples 3, 4, 5, 12, 13, 14 and 20, an ultimate tensile strength value of at least about 3,000 lbs./in.$^2$ and ultimate elongation value of at least about 500%, both measured at 150% per minute elongation rate.

EXAMPLE 15

In this example the catalyst was made up from strontium chromate, $SrCrO_4$, supported upon a porous, water adsorptive 8–14 mesh alumina support. The procedure for preparing the catalyst was as in Example 10. The catalyst analyzed 1.00% by weight Cr.

The charging and operating procedures were as in Example 10 with average reaction temperature of 77° C. and pressure ranging from about 500 to about 300 p.s.i.g.

In a reaction time of 13 hours, 231 grams of solid polyethylene were formed, corresponding to a weight ratio of solid polymer:inorganic catalyst of at least 115.5:1. The product was generally similar to those of the foregoing examples. Properties of this polymer, tested as in Example 10, were:

Ultimate tensile strength, lbs./in.$^2$_____ 6260
Ultimate elongation, percent_____ 307

The alumina used as support in this example was a product of Aluminum Company of America, sold as "Activated Alumina F–1" and recommended for drying purposes. It has density of 50 lbs. per cu. ft., and has analysis by weight of 95% $Al_2O_3$, 0.8% $Na_2O$, 0.1% $Fe_2O_3$, 0.02% $TiO_2$, less than 0.1% $SiO_2$, and the balance water.

EXAMPLE 16

In this example phosphorus pentoxide was used to protect the catalyst from any moisture, instead of a metal alkyl. The catalyst was a straight commercial silica-alumina gel cracking catalyst like the catalyst of Example 1. The charge was 10 grams of this catalyst activated at 500° C. for 6 hours in a stream of phosphorus pentoxide dried air and cooled in phosphorus pentoxide dried nitrogen as in Example 1. Also in the charge was 1 gram of solid phosphorus pentoxide slurried in 100 ml. of normal hexane dried by slurrying with phosphorus pentoxide and filtered as in Example 1.

The procedure was as in Example 1, using average reaction temperatures of 80° C., as measured by a thermocouple at the center of the autoclave, and pressures ranging from about 1850 to about 650 p.s.i.g. In a reaction period of 50 hours, 308 grams of solid polyethylene were formed, corresponding to a weight ratio of solid polymer:inorganic catalyst of at least 30.8:1.

EXAMPLE 17

In this example the catalyst was chromium trioxide supported on activated carbon. 10 grams of 6–14 mesh lumps of activated charcoal (Fisher C–24212) were allowed to stand 3 days with 200 cc. of aqueous 7% by weight chromic acid solution in distilled water. The preparation was filtered and dried in an oven and was then activated by heating for 6 hours at 500° C. in a stream of nitrogen dried with phosphorus pentoxide, and was then allowed to cool in the nitrogen stream.

The reaction vessel was a 320 ml. rocking autoclave, charged by the procedure of Example 1. The charge consisted of an amount of the above catalyst weighing 2 grams prior to activation, 25 cc. of commercial hexane distilled from phosphorus pentoxide, and 5 cc. of a 15% by light solution of aluminum triisobutyl in said hexane. The initial ethylene pressure was brought to 600 lbs./in.$^2$; the temperature of the reactor was brought to 90° C., and the reaction was continued for 17 hours with ethylene pressure being restored periodically.

Large irregular gray lumps constituted the product. The weight of product including catalyst was 30 grams, corresponding to a weight ratio of solid polymer: total catalyst including the activated carbon support of at least 14:1.

EXAMPLE 18

The catalyst in this example was a commercial 10% molybdenum trioxide supported on "Unigel," believed to be a silica gel. It was obtained from Harshaw Chemical Company of Cleveland, Ohio. It was in the form of ⅛ in. pellets which are too strong to be broken between the fingernails.

This catalyst was activated by heating at 500° C. for 6 hours in a stream of nitrogen dried by phosphorus pentoxide, and was cooled in the nitrogen stream.

The reaction was carried out as in Example 17 above at average reaction temperature of 90° C. and ethylene pressure about 500 p.s.i.g. for 73 hours. The product was in the form of expanded pellets weighing 54.4 grams, corresponding to a weight ratio of solid polymer:inorganic catalyst of at least 26:1.

Tested as in Example 10, the product showed:

Ultimate tensile strength, lbs./in.$^2$_____ 4030
Ultimate elongation, percent_____ 260

EXAMPLE 19

The catalyst used in this example was commercial Harshaw vanadia catalyst "V–0301" in the form of ⅛" pellets which are hard but can be broken between the fingernails. One gram of the catalyst was activated at 500° C. for 6 hours in a stream of phosphorus pentoxide dried air, and was then cooled in phosphorus pentoxide dried nitrogen as in Example 1. The charge in addition to this amount of catalyst was 15 cc. of hexane distilled from phosphorus pentoxide and 5 cc. of a 15% by weight solution of aluminum triisobutyl in said hexane.

This example was carried out in the same manner as Example 17, using average reaction temperature of 90° C., ethylene pressure about 500 p.s.i.g., and reaction time of 44 hours.

The product consisted of expanded pellets weighing 33 grams, corresponding to a weight ratio of solid polymer: inorganic catalyst of at least 32:1. Tested as in Example 10 above, the product showed:

Ultimate tensile strength, lbs./in.$^2$_____ 5000
Ultimate elongation, percent_____ 280

EXAMPLE 20

A strontia-chromia catalyst supported on silica-alumina gel, prepared as in Example 6, was used in this example. One gram of the catalyst was activated as in Example 1 at 500° C. for 6 hours, and after cooling was charged to a 320 ml. rocking autoclave. The charge and operating procedure were otherwise as in Example 17 above, using 90° C. average temperature and ethylene pressures in the range of about 600–400 p.s.i.g.

When the ethylene pressure drops totalled 600 p.s.i.g. the autoclave was cooled and vented and was then pressurized to 110 p.s.i.g. with propylene purified as in Example 6, and was heated to 90° C. operating temperature. When the pressure had dropped to about atmospheric, the autoclave was again pressurized with ethylene to 940 p.s.i.g., and reaction was continued at 90° C. operating temperature until the ethylene pressure drops totalled 940 p.s.i.g. Then the previous operations were repeated using 80 p.s.i.g. of propylene and finally 1060 p.s.i.g. of ethylene.

The product was a white, homogeneous, granular solid including enlarged pellets. The weight of product was 133 grams, corresponding to a weight ratio of solid polymer:inorganic catalyst of at least 132:1. The total reaction time for ethylene polymerization was 32 hours and for propylene polymerization was 26 hours, 58 hours in all.

When tested as in Example 10 above, the product showed:

Ultimate tensile strength, lbs./in.² _____ 4520
Ultimate elongation, percent _____ 570

EXAMPLE 21

A pigment-type silica powder (prepared in the vapor phase) having particle size 0.015–0.0290 micron and surface area 175–200 square meters per gram was impregnated with an aqueous chromic acid solution containing 7% by weight $CrO_3$. After standing 2 hours the material was filtered and dried in air at 100° C.

Lumps of catalyst agglomerate were thus obtained which polymerized ethylene in accordance with our process at a rate of 12.5 grams polymer per gram of catalyst per hour giving solid polymer:catalyst ratio of 156.

EXAMPLE 22

A silica gel catalyst of surface area 800 square meters per gram and average pore diameter about 20–25 A. when impregnated with magnesium chromate along the lines of Example 11 above showed initial polymerizing activity in our process, but rapid loss of activity.

When initially ground to 200 mesh before the impregnation with aqueous magnesium chromate, and pelleted, the catalyst gave satisfactory performance in our process.

Our tests have shown that mild steel autoclaves and stainless steel autoclaves give essentially the same results in the procedures of the above Examples 1–22.

On the basis of the foregoing description and examples, our process in one aspect can be generalized as comprising: at least intermittently contacting ethylene in gaseous phase with porous, frangible, solid contact substance, said substance incorporating, throughout, a polymerization catalyst active for ethylene polymerization to solid polymers at temperatures ranging from about 120° C. down, said substance having total surface area of at least about one square meter per gram, which substance is porous such that the interior is accessible to ethylene gas, and which is frangible such that the substance will break into pieces from the internal pressure caused by formation of solid ethylene polymer internally of the substance, said pieces serving as active ethylene polymerization catalyst; and maintaining temperatures of the ethylene-catalyst system sufficiently low that as solid polyethylene accumulates in and on the catalyst pieces, there are formed porous, friable, solid polyethylene-catalyst masses without local overheating and fusion of the polyethylene; and continuing said contact of ethylene with the said catalyst at said temperatures and under polymerizing conditions until the ratio by weight of polyethylene to catalyst reaches at least 10:1 and the catalyst, as a result of repeated breakages into smaller pieces and accumulation of polyethylene in and on the pieces, is uniformly distributed throughout the polyethylene.

Correspondingly our product can be defined as consisting essentially of solid, friable masses of polyethylene, said polyethylene containing fragmented solid, frangible catalyst, in which masses the ratio of polyethylene to catalyst is not less than 10:1, and in which the fragmented catalyst consists of small particles resulting from repeated breakage of larger catalyst pieces, said particles being uniformly distributed throughout the polyethylene.

The essential features of the above-stated aspect of our invention are the activity and the physical properties of the catalyst, rather than its specific composition; operation with ethylene in the gaseous phase rather than in solution or condensed phase; and maintenance of sufficiently low temperatures throughout the catalyst mass to avoid fusion of the solid polyethylene product.

Polymerization catalysts active for ethylene polymerization to solid polymers at temperatures ranging from about 120° C. down are broadly known. Examples are given in the foregoing; other examples include titanium tetrachloride and the like in the presence of aluminum alkyls and the like; and various organic compounds capable of decomposing into free radicals. In accordance with the above-stated aspect of our invention such catalyst is to compose or be incorporated throughout a solid contact substance which is porous and frangible. Thus the interior of this solid contact substance will be catalytically active for polymerizing ethylene to solid polymers; moreover, this interior is to be accessible to ethylene from the gaseous phase.

Then ethylene will penetrate into the interior of the contact substance under our reaction conditions and will polymerize internally of the contact substance to solid ethylene polymer. As solid polymer accumulates it will create internal pressure in the contact substance. The contact substance is to be frangible under such pressure; then the contact substance will break into pieces and these pieces in turn, having active ethylene polymerization catalyst incorporated throughout, will serve as active ethylene polymerization catalyst.

In order that this process continue to a polymer:catalyst weight ratio such as 10:1 and higher, polymerizing conditions must be maintained and the polyethylene-catalyst masses must remain porous and not become blocked by liquid or coated with fused polymer. Accordingly the catalyst must at least intermittently contact ethylene in the gaseous phase under ethylene polymerizing conditions, and temperatures must be maintained at which substantially no fusion of solid polymer on the catalyst occurs.

More specifically, our process comprises use of a solid contact polymerization catalyst comprising an oxygen-containing compound of an amphoteric metal and having total surface area of at least 100 square meters per gram, in the form of a porous, frangible agglomerate. This contact substance is composed of small particles, no larger than 50 mesh and preferably about 200 mesh or finer, more or less loosely bonded together. It contains macropores throughout, of diameter of at least 200 A.; it has average pore diameter of at least 50 A. and bulk density not greater than about ⅓ the density of the predominating constituent compound of the catalyst agglomerate, shown by this compound in its highest density crystalline form.

We claim:

1. Process for polymerizing ethylene which comprises at least intermittently contacting ethylene in gaseous phase with porous, frangible solid contact substance said substance incorporating, throughout, a polymerization catalyst active for ethylene polymerization to solid polymers at temperatures ranging from about 120° C. down said contact substance including a porous, frangible agglomerate of at least one member of the group consisting of silica, alumina, and titania, said substance having total surface area of at least 1 square meter per gram and having average pore diameter of at least 50 A. and bulk density not greater than about one-third the density of the predominating constituent compound of the catalyst agglomerate shown by this compound in its highest density crystalline form, which substance is porous such that the interior is accessible to ethylene gas and which is frangible such that the substance will break into pieces from the internal pressure caused by formation of solid ethylene polymer internally of the substance, said pieces serving as active ethylene polymerization catalyst; and maintaining temperatures of the ethylene-catalyst system not above about 120° C. and sufficiently low that as solid polyethylene accumulates in and on the catalyst pieces, there are formed porous, friable solid polyethylene-catalyst masses without local overheating and fusion of the polyethylene; and continuing said contact of ethylene with the said polyethylene-catalyst masses at said temperatures and under polymerizing conditions until the ratio by weight of polyethylene to the contact substance incorporating the catalyst reaches at least 10:1 and contact substance incorporating the catalyst, as result of repeated breakages into smaller pieces and accumulation of polyethylene in and on the pieces, is uniformly distributed through the polyethylene.

2. Process as defined in claim 1 wherein chromium is one ingredient of a catalytically active oxygen-containing compound in the solid catalyst.

3. Process as defined in claim 1, wherein said catalyst consists essentially of silica-alumina, in the form of a ground-up dried gel and in proportions of about 10–15 parts by weight of alumina per 100 parts by weight of silica plus alumina, and of chromium in chemical combination with oxygen in amounts between about 0.05% and about 15% by weight of Cr based on the total weight of the catalyst.

4. Process for polymerizing at least one gaseous olefin of the group consisting of ethylene and propylene to form in the reaction vessel dry, solid porous polyolefin/contact catalyst masses permeable to gaseous olefins and containing, throughout, frangible particles of active contact catalyst accessible to the gaseous olefin, said process comprising: impregnating throughout with at least one component of a catalyst, active to form solid polymer of the olefin at low temperature and pressure, a porous frangible inorganic support, said support being an agglomerate of at least one member of the group consisting of silica, alumina, and titania and having high surface area of at least 100 square meters per gram and having large average pore diameter averaging at least about 50 A. and having bulk density not above about one-third the density of the predominating constituent compound; said catalyst component, thus supported, forming a contact mass such as to produce activity for polymerizing the gaseous olefin to solid polymer at a rate of at least about 0.05 gram of solid polymer per unit of (grams of contact mass) × (hours of reaction time) × (atmospheres of olefin gas pressure) when the final contact catalyst is formed and tested under the conditions below specified; freeing the resulting contact mass of any poisons including water; protecting the poison-free contact mass from sorbing poisons including molecular oxygen; providing in the polymerization zone an inert, substantially poison-free coolant of atmospheric pressure boiling point not above about 200° C. which can be sorbed by the contact mass and volatilized therefrom to prevent hot spots developing therein, thus maintaining throughout the reaction mass temperatures below the fusion temperature and below the dissolution temperature of the solid olefin polymer, amounts of said coolant being such that the contact mass will not be continuously submerged in liquid, the minimum amount thereof being at least about the weight of the above recited agglomerate and maximum amount thereof, measured by liquid volume, being not greater than about one-tenth the volume of the polymerization zone cited below, and purity of the system including the contact mass being so high as to give not above 1000 parts per million by weight of total impurities, calculated as oxygen in the reacting gas; contacting the poison-free contact mass with a substance reactive with molecular oxygen and reactive with water to substantial completion upon contact at temperatures not above about 120° C.; and at least intermittently contacting the poison-free contact mass in a polymerization zone with the aforesaid gaseous olefin, substantially free of catalyst poisons, in gas phase and while maintaining temperatures in the gas phase not above about 120° C. and pressures not above about 1500 p.s.i.g. the aforesaid inert coolant being at least in part adsorbed in the catalyst and volatilized from hot spots thereof; any unadsorbed, unvolatilized liquid, which initially contacts the catalyst, intermittently washing the catalyst; the liquid initially present being eventually entirely taken up in the polymer accumulated on the catalyst so that for most of the polymerization the reaction zone is free of liquid; and maintaining said conditions while solid olefin polymer accumulates, without fusion, internally of the contact mass and fragments the contact mass by exerting internal pressure thereon, producing solid, porous, polyolefin/contact catalyst masses having therein active polymerization sites which remain accessible to the olefin gas; and continuing said operations at least to the point of reaching a weight ratio of about 50:1 of solid polymer produced:contact mass employed, whereby the product is obtained as dry, solid, porous polyolefin/contact catalyst masses containing at most about 2% of contact catalyst, incorporated throughout and practially all of said catalyst being so finely divided as to be invisible in films formed from said masses.

5. Process as defined in claim 4 wherein the olefin polymerized is at least predominantly ethylene.

6. Process as defined in claim 5 wherein the support is impregnated with magnesium chromate.

7. Process as defined in claim 5 wherein a support used is a dried gel and a substance, reactive with molecular oxygen and water, contacted with the contact mass is a metal alkyl.

8. Process as defined in claim 7 wherein the support is a silica gel agglomerate composed of small particles no larger than 50 mesh, agglomerated to give average pore diameter of at least 50 A.

9. Process as defined in claim 8 wherein the support is impregnated with magnesium chromate and the metal alkyl contacted with the contact mass is aluminum triisobutyl.

10. Polyethylene product of average molecular weight by the Harris viscosity method of at least about 300,000 and having a structure of long branching chains as indicated by its levelling toward constant molecular weight of about 20,000 under continued action thereon of oxygen in refluxing xylene solution, said polyethylene being produced by the process of claim 5.

11. Process as defined in claim 7 wherein the support is a dried silica-alumina gel containing 10–15% $Al_2O_3$ and the balance $SiO_2$ with at most traces of impurities; the support is impregnated with magnesium chromate; and the metal alkyl is aluminum triisobutyl.

References Cited in the file of this patent

UNITED STATES PATENTS

| | | |
|---|---|---|
| 2,691,647 | Field et al. | Oct. 12, 1954 |
| 2,692,259 | Peters | Oct. 19, 1954 |
| 2,727,023 | Evering et al. | Dec. 13, 1956 |
| 2,731,452 | Field et al. | Jan. 17, 1956 |
| 2,824,089 | Peters et al. | Feb. 18, 1958 |
| 2,825,721 | Hogan et al. | Mar. 4, 1958 |

FOREIGN PATENTS

| | | |
|---|---|---|
| 571,814 | Great Britain | Sept. 11, 1945 |
| 572,695 | Great Britain | Oct. 19, 1945 |

UNITED STATES PATENT OFFICE
CERTIFICATE OF CORRECTION

Patent No. 3,050,514                  August 21, 1962

Thomas M. Cawthon, Jr., et al.

It is hereby certified that error appears in the above numbered patent requiring correction and that the said Letters Patent should read as corrected below.

Column 2, line 67, for "alternatively" read -- alternately --; column 4, line 53, for "Since" read -- Zinc --; column 7, line 50, for "catalyst" read -- catalysts --; column 13, line 60, for "tack" read -- tacky --; column 16, line 41, for "20.5:1" read -- 201.5:1 --; column 17, line 73, for "light" read -- weight --; column 19, line 10, for "0.0290" read -- 0.020 --; column 21, line 15, for "of" read -- as --.

Signed and sealed this 5th day of February 1963.

(SEAL)
Attest:

ERNEST W. SWIDER
Attesting Officer

DAVID L. LADD
Commissioner of Patents